May 26, 1959 R. O. BALOGH 2,888,299
TOWER VEHICLES
Filed Jan. 14, 1953 5 Sheets-Sheet 2
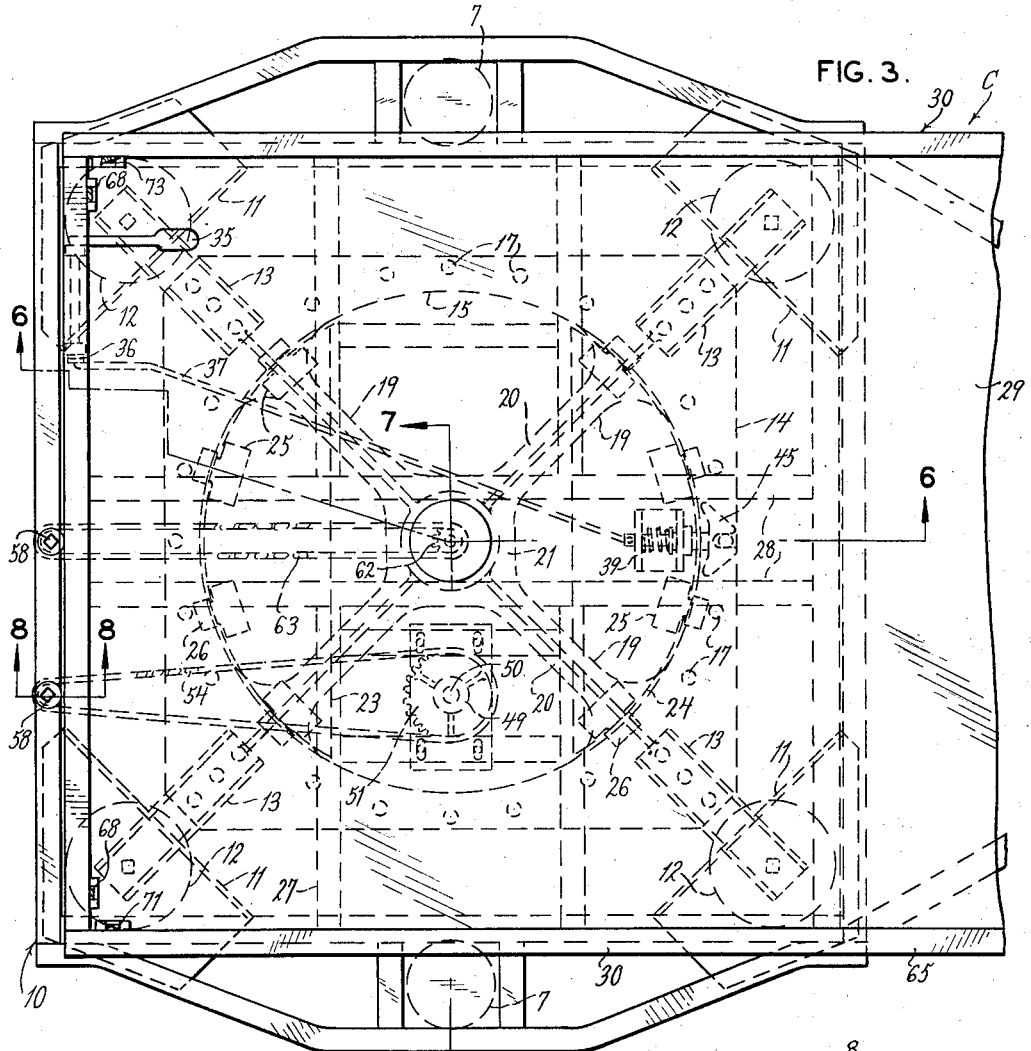
INVENTOR.
ROY O. BALOGH
BY
ATTORNEY

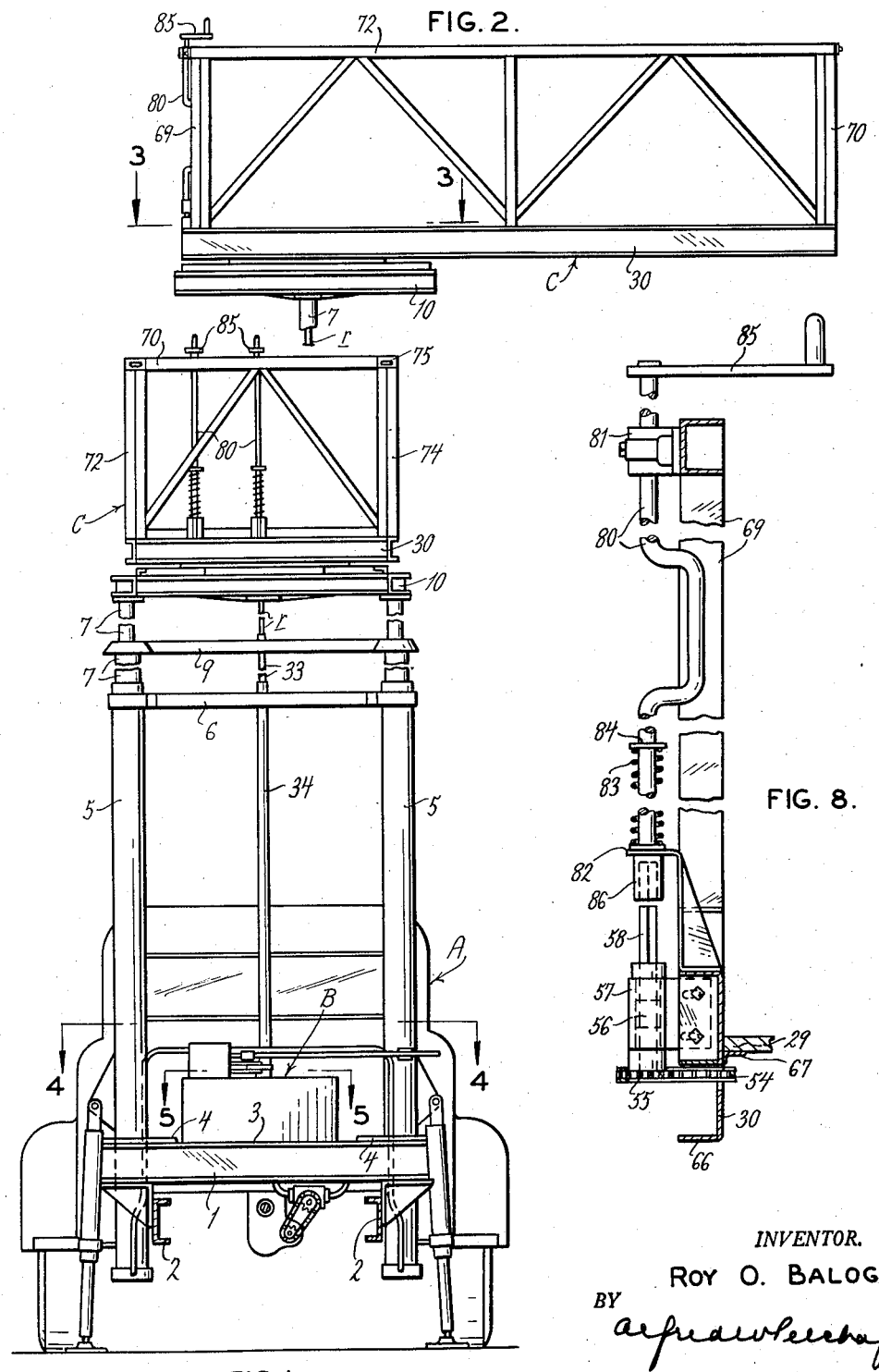

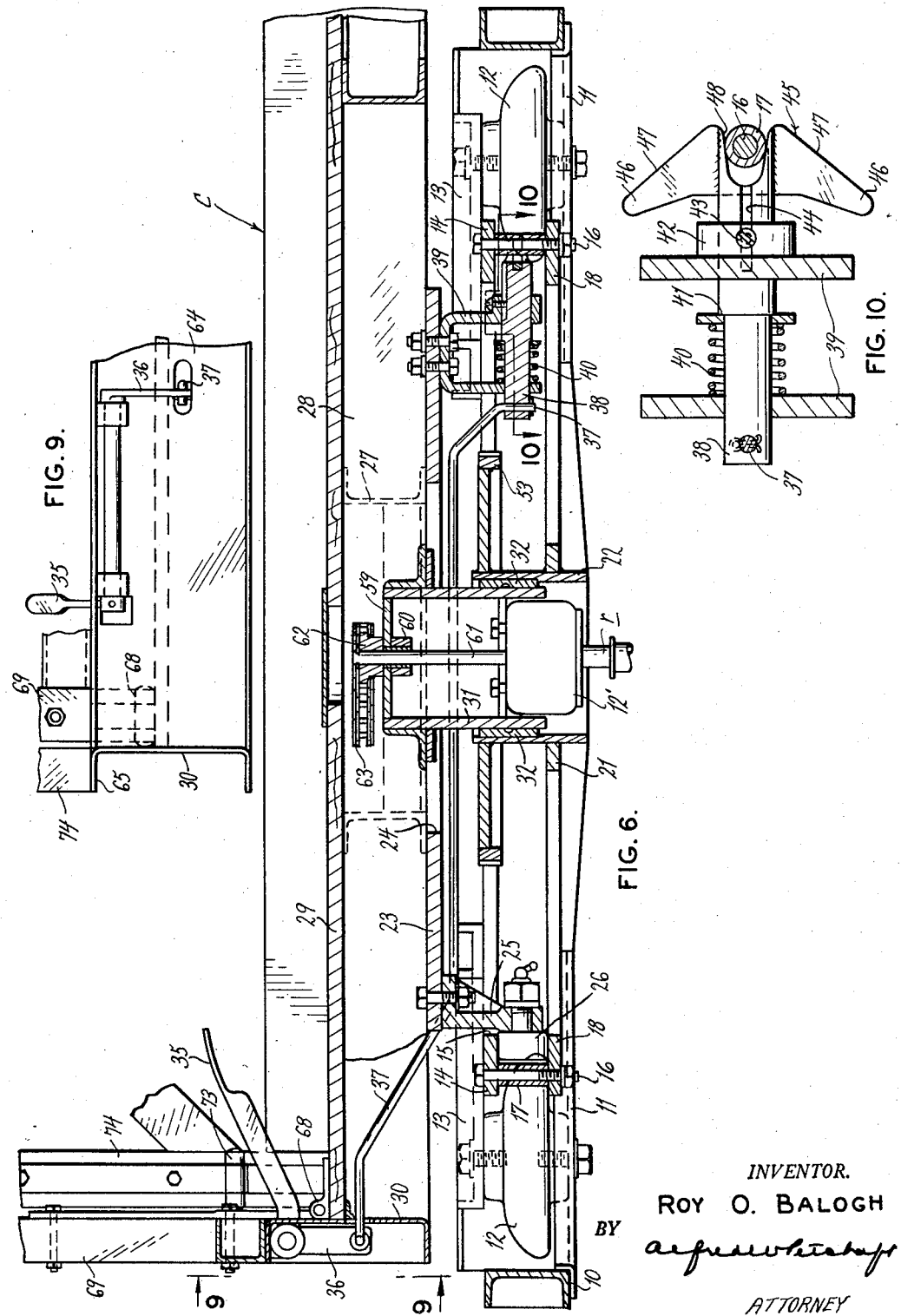

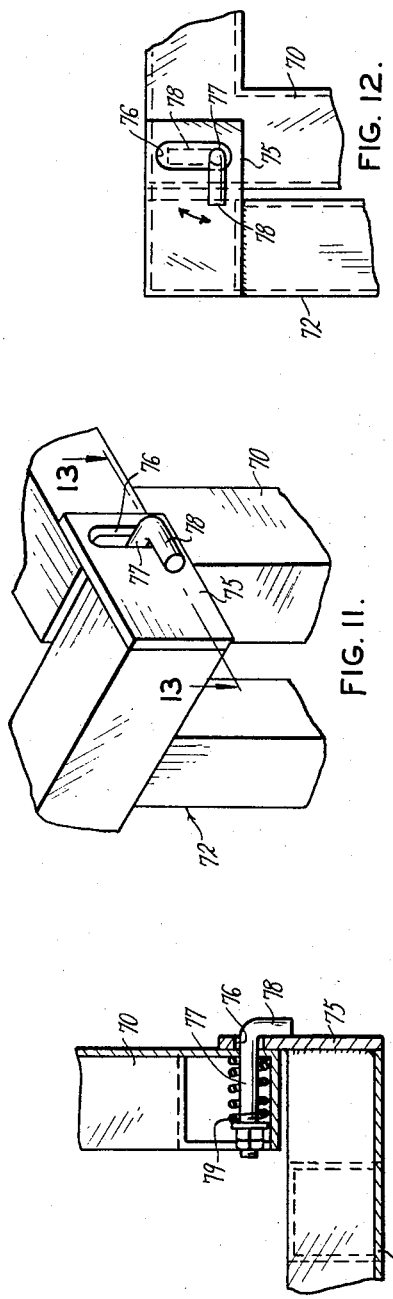
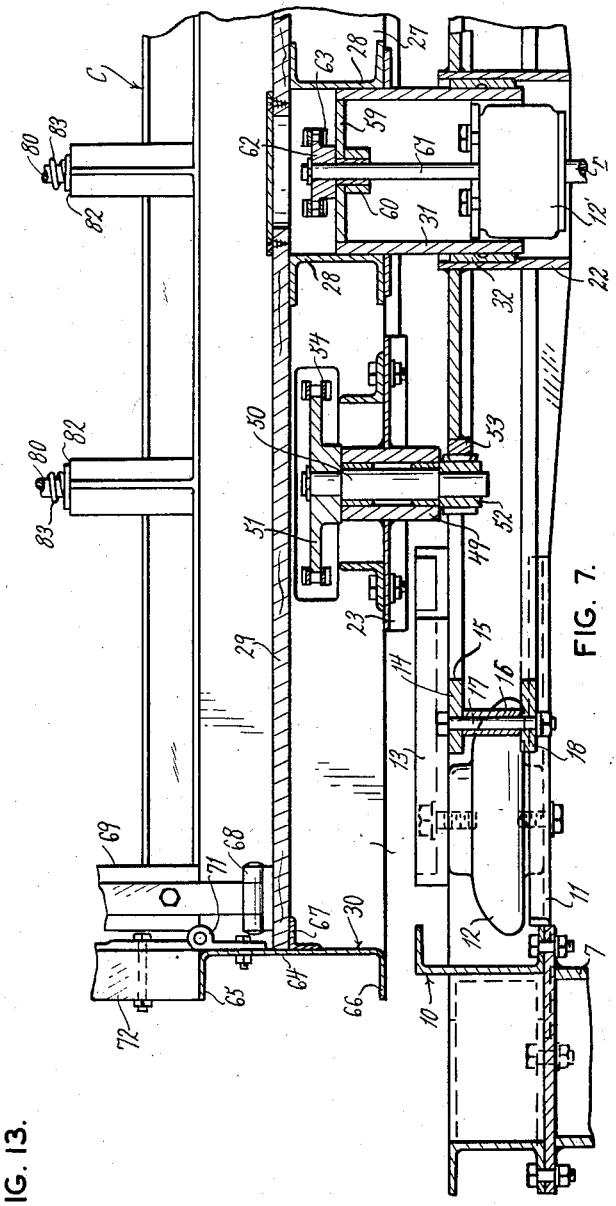

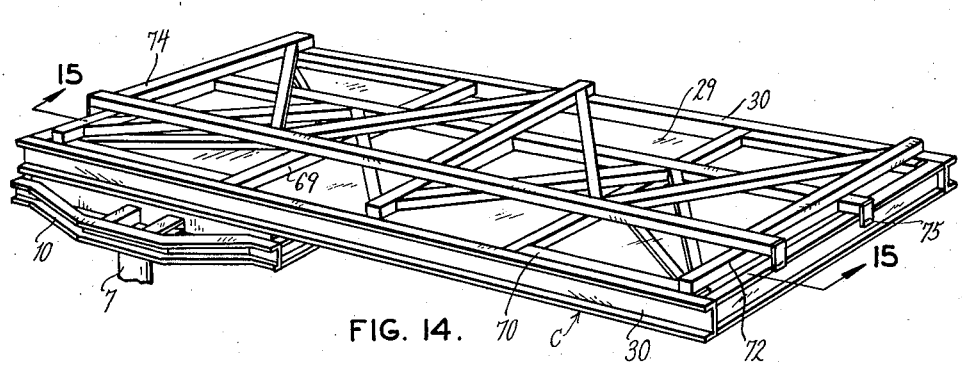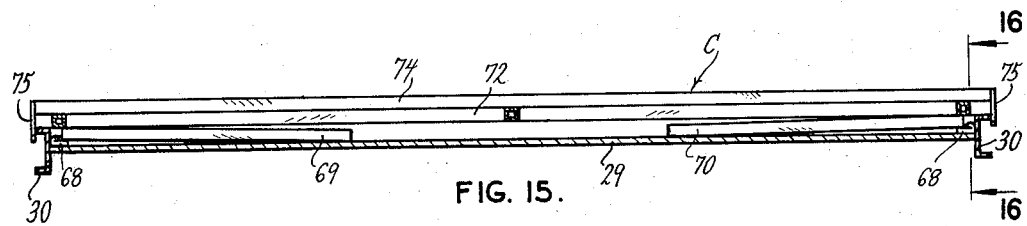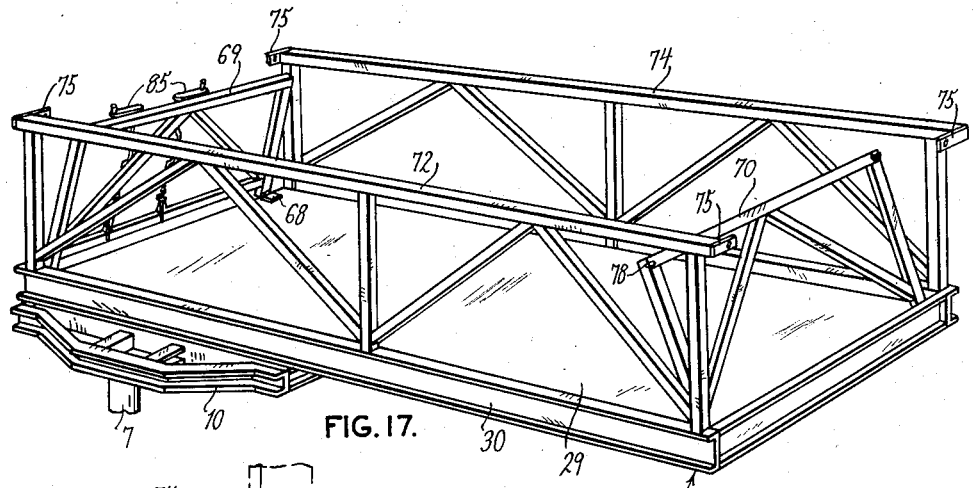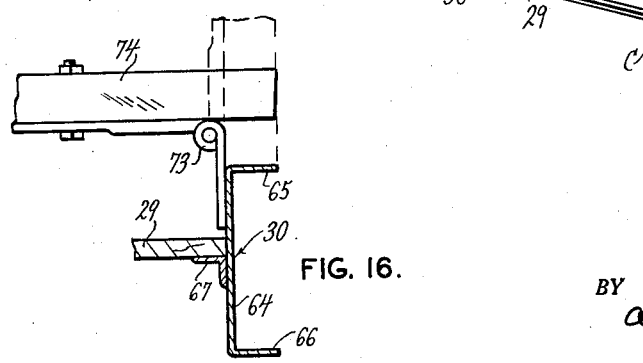

United States Patent Office 2,888,299
Patented May 26, 1959

2,888,299
TOWER VEHICLES

Roy O. Balogh, Clayton, Mo., assignor to McCabe-Powers Auto Body Co., St. Louis, Mo., a corporation of Missouri Application January 14, 1953, Serial No. 331,242

7 Claims. (Cl. 304—29)

This invention relates in general to certain new and useful improvements in tower vehicles and, more particularly, to a tower structure for use in the servicing of utility equipment, such as power lines, transformer poles, trolley lines and the like.

It is the primary object of the present invention to provide a tower vehicle having an elevating work platform which is capable of rotation in a complete circle around its vertical axis and can be conveniently stopped and locked in a number of different positions.

It is another object of the present invention to provide a tower vehicle having an elevating and rotating platform which is simply and durably constructed in a unique manner to provide a relatively inexpensive, but sturdy, track structure in which the work platform may rotate and which includes a plurality of annular spaced vertical spacer members into which the locking mechanism can be optionally engaged.

It is another object of the present invention to provide a work platform for a tower vehicle which can be controlled by workmen from the platform when the platform is in elevated position.

It is a further object of the present invention to provide a work platform for a tower vehicle having railings which can be lowered to provide greater compactness of the structure while the vehicle is traveling from place to place and also for the additional purpose of permitting heavy objects to be elevated to a desired position for installation and shifted laterally outwardly from the platform to such installation position without interference while, at the same time, providing a safety interlock between the tower operating controls and the railings to prevent unauthorized movement of the tower while the railings are in non-operative position.

With the above and other objects in view, my invention resides in the novel features of form, construction, arrangement, and combination of parts presently described and pointed out in the claims.

In the accompanying drawings (five sheets)

Figure 1 is a rear end elevational view of a motor vehicle equipped with an elevating tower constructed in accordance with and embodying the present invention;

Figure 2 is a fragmentary side elevational view of the work platform;

Figure 3 is a fragmentary sectional view taken along line 3—3 of Figure 2;

Figures 4 and 5 are fragmentary sectional views taken along lines 4—4 and 5—5, respectively, of Figure 1;

Figures 6, 7, and 8 are fragmentary sectional views taken along lines 6—6, 7—7, and 8—8, respectively, of Figure 3;

Figures 9 and 10 are fragmentary sectional views taken along lines 9—9 and 10—10, respectively, of Figure 6;

Figure 11 is a fragmentary perspective view of the work platform showing in detail the corner locking construction of the railings;

Figure 12 is a fragmentary end elevational view of the railings corner locking construction;

Figure 13 is a fragmentary sectional view taken along line 13—13 of Figure 11;

Figure 14 is a fragmentary perspective view showing the tower platform with the railings in folded down or transport position;

Figure 15 is a fragmentary sectional view taken along line 15—15 of Figure 14;

Figure 16 is a fragmentary sectional view taken along line 16—16 of Figure 15; and Figure 17 is a fragmentary perspective view of the top of the tower showing the platform railings in upright position.

Referring now in more detail and by reference characters to the drawings, which illustrate a preferred embodiment of the present invention, A designates a motor vehicle having a rearwardly extending horizontal platform or truck body 1 which is conventionally mounted on longitudinal frame members 2 of the vehicle chassis. The truck body 1 is conventionally provided with a horizontal floor 3 upon which is rigidly mounted four base plates 4 arranged in a rectangular pattern. Welded to and extending vertically upwardly from each of the plates 4 are tubular tower legs 5 rigidly connected to each other at their upper ends by a rectangular framework 6 in the formation of a four-legged rectangular tower structure. Each of the tubular tower legs is internally provided with a plurality of concentric telescoped tubes 7 and a corresponding internal telescoped series of hydraulically actuated piston sleeves 8 which are connected to a hydraulic system B, as shown in Figure 4 and as more fully described in my co-pending applications Serial Nos. 104,855, filed July 15, 1949, now U. S. Patent No. 2,713,402 and 73,426, filed January 28, 1949, now abandoned. As fully explained in these co-pending applications, the piston sleeves 8 may be raised or retracted hydraulically to the limit permitted by the external leg-forming tubes 7 through hydraulic pressure functioning by a pump or any other suitable hydraulic driving mechanism. The intermediate leg-forming tubes 7 are interconnected at their upper ends by a rectangular framework 9 substantially similar to the rectangular framework 6 and the innermost leg-forming tubes, that is to say the tubes which are uppermost when the tower is fully extended are tied together at their upper ends by a relatively rigid, strong rectangular top frame 10 formed preferably of heavy channel iron or similar material.

Welded or otherwise suitably mounted across the four corners of the top frame 10 are gusset plates 11 for supporting large heavy dielectric insulators 12 which are bolted thereto on their under faces and are, in turn, bolted on their upper faces to the outer ends of four diagonal channel-shaped arms 13, which are, in turn, rigidly attached to the four corners of a rectangular upper track plate 14 having a large centrally disposed circular aperture 15. Mounted in downwardly spaced parallel relation to the upper track plate 14 by means of a plurality of annularly spaced tubular sleeves 16 and bolts 17 is a lower rectangular track plate 18, which is preferably, though not necessary, provided with four quarter-segment lightening apertures 19 which are separated by radial spoke-like elements 20 integrally connected with a central hub portion 21, which is, in turn, rigidly secured to a vertical tubular sleeve 22.

Disposed in upwardly spaced parallel relation to the upper and lower track plates 14, 18, is a circular platform sub-frame 23 preferably having an external diametral dimension substantially equal to the internal diametral dimension of the aperture 15 of the upper track plate 14 and being located in concentric relation to such aperture 15. The platform sub-frame 23 is centrally provided with a relatively large concentric circular aperture 24 and upon its under face is further provided around its periphery with an annularly spaced series of depending brackets 25 each provided in its lower end with a conventional ball-bearing roller 26 operatively located between the upper and lower track plates 14, 18, and adapted to roll freely upon the upwardly presented face of the track plate 18, being merely restrained against unauthorized upward movement by the track plate 14.

Welded or otherwise suitably secured upon and extending transversely across the upper face of the platform sub-frame 23 are a series of outwardly extending platform supporting beams 27, 28, which are, in turn, provided with a rectangular platform floor 29 which is marginally bound together by peripheral channel members 30 into a strong platform C. The beams 27, 28, are unlaced in the center of the structure and rigidly secured to a short depending bearing sleeve 31 which projects downwardly and concentrically into a bearing ring 32, which is mounted interiorly within the upper end of the sleeve 22 and thereby operates as a pintle or vertical bearing around which the platform C may rotate. Rotatably disposed within the sleeve 31 is an insulator 12' which is rigidly fixed upon its under face to the upper end of a control rod r telescopically fitted within a series of companion control tubes 33, 34, extending down to the floor 3 of the truck body 1, all as best seen in Figures 1 and 7 and for purposes presently more fully appearing. It may be pointed out in this connection that the rollers 26 take all the vertical load of the platform C and the sleeve 31 serves as the circular bearing to maintain concentricity of rotation.

Rockably mounted in one of the peripheral frame members 30 is a foot pedal 35 having a depending rockarm 36 which is swivelly connected at its lower end to a pull-rod 37 which extends radially inwardly toward the center of the platform C and is deflected downwardly by a series of suitable clearance bends for operative engagement in the inwardly presented end of a latch bolt 38 which is shiftably mounted in and extends horizontally through an inverted U-shaped bracket 39 bolted upon the under face of the platform sub-frame 23. The bolt is biased outwardly with respect to the bracket 39 by means of a compression spring 40 which bears against a stop shoulder 41 formed on the latch bolt 38. At its outer end the latch bolt 38 extends slidably through an external collar 42 which is, in turn, rigidly secured to the outer face of the bracket 39 and is provided with a downwardly projecting set screw 43, the lower end of which is slidably engaged in a longitudinal key slot 44 formed in the outwardly projecting end of the latch bolt 38 so that the latter will not tend to rotate about its horizontal axis as it shifts in and out. At its outermost end, the latch bolt 38 is provided with a transversely extending symmetrical latch plate 45 having oppositely projecting lateral arms 46, respectively provided with inclined camming faces 47. The latch plate is centrally provided with an inwardly extending detent notch 48 which is sized for matching engagement with any one of the spacer sleeves 17, all as best seen in Figure 10. Thus, it will be evident that by stepping on the pedal 35 the latch bolt 38 is retracted and the detent notch 48 is disengaged from any one of the spacer sleeves 17 so that upon rotation of the platform a different spacer sleeve 17 may be engaged to lock the platform in some different position to which it has been rotated.

Bolted to and extending vertically through the platform sub-frame 23 is a vertical bearing sleeve 49 for rotatably supporting a short stub shaft 50 provided on its upper end with a sprocket 51 pinned or otherwise rigidly fastened thereto by any convenient means. Similarly, pinned or otherwise rigidly mounted to the lower projecting end of the stub shaft 50 is a pinion 52 adapted for meshing engagement with a large ring gear 53 mounted on and extending concentrically around the upper end of the sleeve 22 and being either welded or otherwise rigidly fastened thereto so that when the pinion 52 is rotated the platform will be propelled circularly around the trackway designed between the track plates 14, 18. The sprocket 51 is rotated by means of a conventional roller-type sprocket chain 54 which is trained around the sprocket 51 and extends radially outwardly therefrom to the peripheral margin of the platform C and is similarly trained around a smaller sprocket 55, which is pinned upon the lower projecting end of a short shaft 56 journaled in a vertical tubular bearing sleeve 57 which is, in turn, rigidly mounted upon one of the marginal channel members 30 forming a part of the platform structure. The shaft 56 projects upwardly above the sleeve 57 and is integrally provided with a square-ended portion 58, all as best seen in Figure 8 and for purposes presently more fully appearing.

The bearing sleeve 31 is provided across its upper end with an end plate 59 which is centrally provided with a coaxial depending bearing sleeve 60 for rotatably supporting a control shaft 61 which extends therethrough and is fastened at its lower end to the insulator 12'. At its upper end, the control shaft 61 is rigidly provided with a sprocket 62 connected by means of a sprocket chain 63 to a second driving sprocket assembly operatively mounted adjacent the periphery of the platform which latter sprocket assembly is identical in all respects with the previously described sprocket 55, shaft 56, bearing sleeve 57, and is, in fact, in every respect, a duplicate of such mechanism.

As may be noted by reference to Figure 7, the peripheral channels 30 forming the external framework around the platform floor 29 are outwardly presented C-shaped channels including a vertical web 64 and upper and lower horizontal flanges 65, 66, respectively, and welded or otherwise rigidly secured upon the inwardly presented faces of the web 64 approximately midway between the channels 65, 66, are inwardly flanged angle iron sections 67 for supporting the peripheral margins of the floor 29, so that a substantial portion of the channel members 30 extend upwardly above the level of the floor 29 around the entire periphery thereof. Swingably mounted by means of hinges 68 to the floor 29 and extending across the opposite parallel transverse margins thereof are forward and rearward frame-like railing panels 69, 70, adapted to swing from a position flatwise upon the upper face of the floor upwardly into a vertical position with their lower margins abutting supportingly against the upwardly extending inner face portions of the web 64 of the channel members 30. As may be seen by reference to Figure 15, the railing panels 69, 70, lie substantially flatwise within the confines of the platform frame formed by the channel members 30 when in downwardly swung or horizontal position with their upwardly presented faces substantially flush with the upwardly presented faces of the channel flanges 65. Similarly mounted upon one of the channels 30 by means of hinges 71 and extending along one longitudinal margin of the platform floor 29 is a frame-like side railing panel 72 which is adapted to swing downwardly into horizontal position in flatwise overlying relation upon the panels 69, 70. As will be noted by reference to Figure 7, the side railing panel 72, when swung upwardly into vertical position, will abut along its downwardly presented under face against the upper face of the channel flange 65. Similarly mounted by means of hinges 73 to the opposite longitudinally extending channel member 30 is a second frame-like side railing panel 74, substantially identical in size and shape to the side railing panel 72. The hinges 73 are fastened to the side railing panel 74 somewhat above the lower transverse margin thereof so that when the side railing panel 74 is swung downwardly into non-operative or horizontal position, it will rest in substantially horizontal overlying relation upon the side railing panel 72 and, when swung upwardly into upright position, will abut along its downwardly presented under face upon the upper face of the channel flange 65, substantially as shown in Figure 16.

The side railing panels are provided at their upper corners with latch plates 75 which extend horizontally inwardly when the side railing panels 72, 74, are in upright position and are provided with vertical elongated slots 76 formed in the overhanging portions thereof. Similarly, the corners of the front and rear railing panels 69, 70, are provided with outwardly projecting latch-rods 77 having perpendicularly bent latch-fingers 78. The latch-rods 77 are adapted for rotatable movement and are provided with compression springs 79 which tend to urge the latch-rods 77 rearwardly and impose a certain amount of frictional resistance to free rotation thereof. When the latch-rods 77 are rotated so that the latch-fingers 78 thereof are in upwardly presented vertical position, and the railing panels 69, 79, are swung upwardly into upright position, as shown in Figure 17, the latch-fingers 78 will pass freely through the slots 78 and the railing panels 69, 70, will come into stop-forming abutment against the inwardly presented faces of the latch plates 75. Thereupon, the latch rods may be pushed slightly forwardly against the bias of the springs 79 and turned so as to lock against the outer faces of the latch plates 75, substantially in the manner as shown in Figure 11, thereby holding the four railing panels 69, 70, 72, 74, in upright position to form a complete railing around the entire periphery of the platform C.

The forward railing panel 69 is provided with two identical crank-rods 80 which are each rotatably mounted in vertical aligned journal fittings 81, 82, and are biased upwardly by means of a compression spring 83 bearing endwise against the bearing fitting 82 and a collar 84 rigidly fixed to the crank-rod 80. At its upwardly projecting end, each of the crank-rods 80 is provided with a radially inwardly extending crank-handle 85 and similarly at its lower end each of the crank-rods 80 is provided with a downwardly opening socket 86 which is internally broached to fit and engage the upwardly presented square end 58 of the shaft 56 and is vertically aligned therewith so that when desired the crank-rod 80 may be pushed downwardly against the bias of the spring 83 into engagement with the associated square end 58 of the shaft 56. It will, of course, be evident that the crank-rods 80 are both normally disengaged and, furthermore, that the shafts 56 cannot be engaged and rotated when the forward railing panel 69 is in downward or non-operative position. Thus, it is impossible for the operator on the work platform C to manipulate the controls unless the railings are in upward or operative position, thereby preventing any hazardous unauthorized use of the structure. The rear railing panel 70, however, can be unlatched and lowered to inoperative position at will without affecting the other three railing panels 69, 72, 74, and, thereby, permitting one end of the railing structure of the work platform C to be opened for access to heavy objects which may be mounted on a linefold or similar structure so that when detached the heavy object can be shifted onto the work platform C and lowered to the ground or at least to a relatively accessible position near the ground. Similarly, a heavy object, such as a transformer or line switch, may be lifted onto the platform C when it is in lowered position and elevated with the platform to the higher level at which it is to be installed. At this higher level, the object can be readily pushed or worked over to the edge of the platform and installed with a minimum of labor and effort.

It should be understood that changes and modifications in the form, construction, arrangement, and combination of the several parts of the tower vehicle may be made and substituted for those herein shown and described without departing from the nature and principle of my invention.

Having thus described my invention, what I claim and desire to secure by Letters Patent is:

1. In an elevating tower having a vertically shiftable framework; a work-platform comprising a first plate secured to and extending horizontally across the framework and being provided with a large central aperture, a second plate disposed in spaced parallel relation to the first plate and secured thereto by means of a plurality of annularly spaced post-like members to provide an annular trackway, a floor structure disposed in spaced parallel relation to said plates and having an annular series of brackets, each of which is provided on its end with a roller having a cylindrical surface which is operatively disposed between said plates, said rollers being adapted for movement in a circular path around said trackway, and bearing-forming means carried by the floor structure and rotatably engaged in said tower framework concentrically with respect to the circular path of movement of the rollers, said bearing-forming means confining said platform against lateral shifting movement and placing only vertical load on said rollers.

2. In an elevating tower having a vertically shiftable framework and a central control tube rigidly connected to and carried by the framework; a work-platform comprising a first plate secured to and extending horizontally across the framework and being provided with a large central aperture, a second plate disposed in spaced parallel relation to the first plate having a large central opening concentric with the opening of the first plate and being secured thereto by means of a plurality of annularly spaced post-like members to provide an inwardly presented annular trackway, a floor structure disposed in spaced parallel relation to said plates and having an annular series of brackets, extending axially downwardly into the central opening of the first plate, each of said brackets being provided on its end with a roller having a cylindrical surface which is operatively disposed between said plates, said rollers being adapted for movement in a circular path around said trackway, and bearing-forming means carried by the floor structure and engaged in said tower framework concentrically with respect to the circular path of movement of the rollers, said bearing-forming means being rotatable with respect to and shiftable within the tower framework so as to confine the work-platform against lateral shifting movement and place only vertical load on the rollers.

3. In an elevating tower having a vertically shiftable framework; a work-platform comprising a first flat plate secured to and extending horizontally across the framework and being provided with a large central aperture, a second flat plate disposed in spaced parallel relation to the first plate having a large central opening concentric with the opening of the first plate and being secured thereto by means of a plurality of annularly spaced post-like members to provide an inwardly presented annular trackway, a floor structure disposed in upwardly spaced parallel relation to said plates and having an annular series of brackets, extending axially downwardly into the central opening of the first plate, each of said brackets being provided on its end with a cylindrical roller operatively disposed between said plates for movement in a circular path around said trackway, and vertically disposed bearing-forming means carried by the floor structure and rotatably engaged in said tower framework concentrically with respect to the circular path of movement of the rollers whereby to confine the platform against lateral shifting movement and place only vertical load on the rollers.

4. In an elevating tower having a vertically shiftable framework; a work-platform comprising a first flat plate secured to and extending horizontally across the framework and being provided with a large central aperture, a second flat plate disposed in downwardly spaced parallel relation to the first plate having a large central opening concentric with the opening of the first plate and being secured thereto by means of a plurality of annularly spaced post-like members to provide an inwardly presented annular trackway, a floor structure disposed in spaced parallel relation to said plates and having an annular series of brackets extending axially downwardly into the central opening of the first plate, each of said brackets being provided on its end with a roller operatively disposed between said plates for movement in a circular path around said trackway, and bearing-forming means carried by the floor structure and engaged in said tower framework concentrically with respect to the circular path of movement of the rollers, said bearing means being rotatable with respect to, and vertically shiftable within, the tower framework whereby to confine the work-platform against lateral shifting movement and place only vertical load on the rollers.

5. In an elevating tower having a vertically shiftable framework; a work-platform comprising a first plate secured to and extending horizontally across the framework and being provided with a large central aperture, a second plate disposed in spaced parallel relation to the first plate and secured thereto by means of a plurality of annularly spaced post-like members to provide an annular trackway, a floor structure disposed in spaced parallel relation to said plates and having an annular series of brackets, each of which is provided on its end with a roller operatively disposed between said plates for movement in a circular path around said trackway, bearing-forming means carried by the floor structure and rotatably engaged in said tower framework concentrically with respect to the circular path of movement of the rollers, and latch means carried by the floor structure, said latch means having a horizontally shiftable radially positioned detent member located adjacent to and inwardly of the inner margin of the trackway, said member having an outwardly presented U-shaped notch which is optionally engageable with any one of the post-like members for holding the floor structure in any selected position for rotation.

6. In an elevating tower having a vertically shiftable framework; a work-platform comprising a first flat plate secured to and extending horizontally across the framework and being provided with a large central aperture, a second flat plate disposed in spaced parallel relation to the first plate having a large central opening concentric with the opening of the first plate and being secured thereto by means of a plurality of annularly spaced post-like members to provide an inwardly presented annular trackway, a floor structure disposed in spaced parallel relation to said plates and having an annular series of brackets extending axially downwardly into the central opening of the first plate, each of said brackets being provided on its end with a roller having a cylindrical surface which is operatively disposed between said plates, said rollers being adapted for movement in a circular path around said trackway, vertically disposed bearing-forming means carried by the floor structure and rotatably engaged in said tower framework concentrically with respect to the circular path of movement of the rollers whereby to confine the platform against lateral shifting movement and place only vertical load on the rollers, a ring gear mounted concentrically with respect to the opening in the first plate and rigidly connected to the tower framework, a shift journaled in and carried by the floor structure, said shaft being provided with a pinion adapted for meshing engagement with the ring gear, and means carried by the platform for rotating said shaft and pinion.

7. In an elevating tower having a vertically shiftable framework; a work-platform comprising a first plate secured to and extending horizontally across the framework and being provided with a large central aperture, a second plate disposed in spaced parallel relation to the first plate and secured thereto by means of a plurality of annularly spaced post-like members to provide an annular trackway, a floor structure disposed in spaced parallel relation to said plates and having an annular series of brackets, each of which is provided on its end with a roller operatively disposed between said plates for movement in a circular path around said trackway, bearing-forming means carried by the floor structure and rotatably engaged in said tower framework concentrically with respect to the circular path of movement of the rollers, latch means carried by the floor structure, said latch means having a horizontally shiftable radially positioned detent member located adjacent to and inwardly of the inner margin of the trackway, said member having an outwardly presented U-shaped notch which is optionally engageable with any one of the post-like members for holding the floor structure in any selected position for rotation, said detent member further being provided with diametrally opposite horizontally projecting flat fins having outwardly presented angular edge-faces which diverge inwardly from the notch for camwise engagement with any one of the post-like members in order to shift the detent member radially inwardly as the work-platform is rotated, and spring means for normally biasing the detent member outwardly into optional engagement with any one of said post-like members.

References Cited in the file of this patent

UNITED STATES PATENTS

| | | |
|---|---|---|
| 346,019 | Birck et al. | July 20, 1886 |
| 530,389 | Brooks | Dec. 4, 1894 |
| 984,063 | Berg | Feb. 14, 1911 |
| 1,761,726 | Havens | June 3, 1930 |
| 2,085,921 | McElheny | July 6, 1937 |
| 2,499,005 | Sellers | Feb. 28, 1950 |
| 2,500,815 | Gerli | Mar. 14, 1950 |
| 2,586,227 | Henderson | Feb. 19, 1952 |
| 2,647,022 | Smid et al. | July 28, 1953 |
| 2,753,224 | Troche | July 3, 1956 |

FOREIGN PATENTS

| | | |
|---|---|---|
| 12,851 | Great Britain | of 1913 |
| 449,754 | Great Britain | June 29, 1936 |
| 423,808 | Germany | Jan. 11, 1926 |